(No Model.)
M. W. PETERSON.
DUMPING BOX OR BUCKET.
No. 589,749. Patented Sept. 7, 1897.
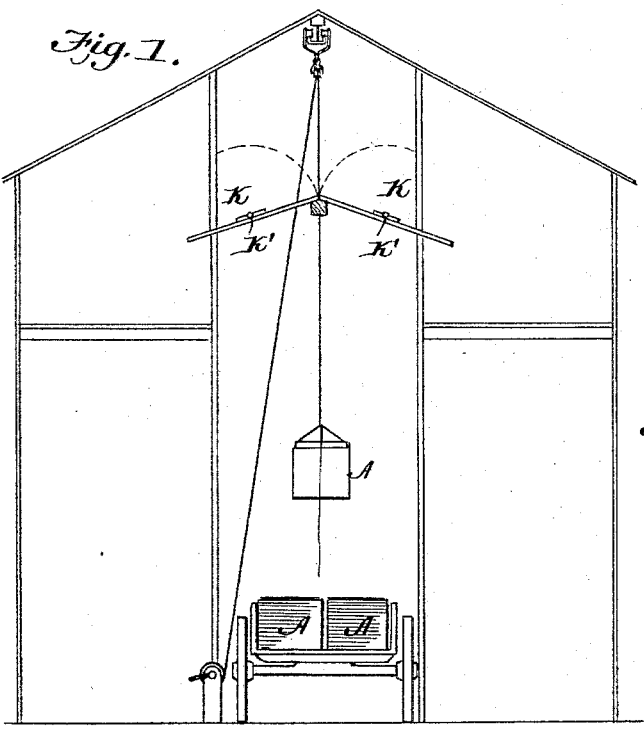
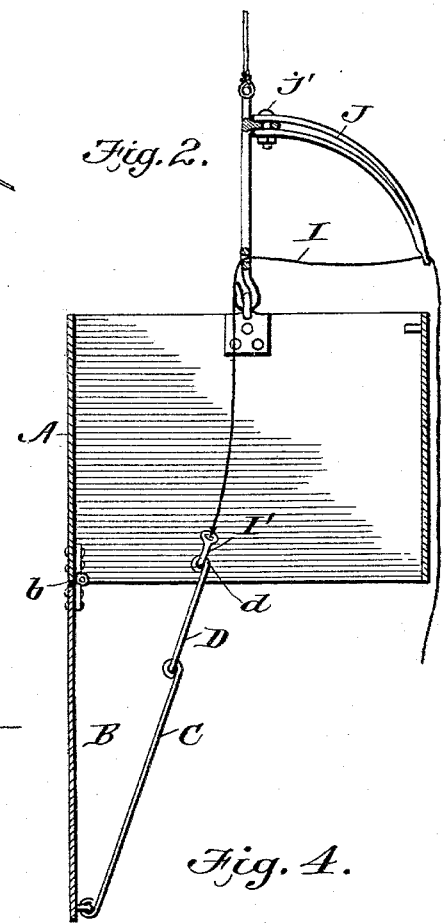
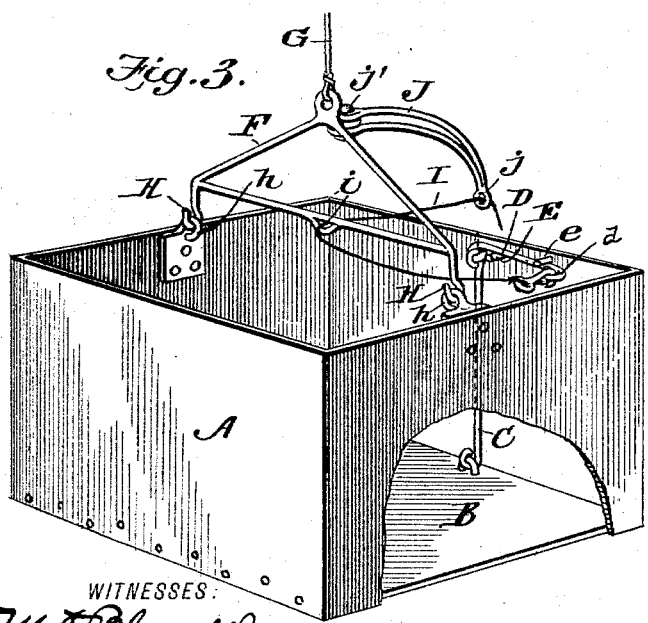
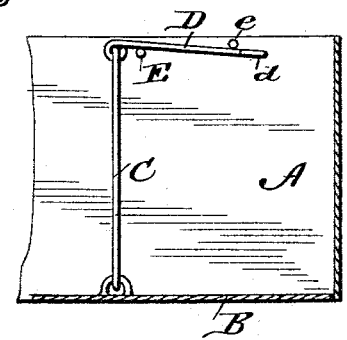
WITNESSES:
M. D. Bloudel
P. B. Turpin
INVENTOR
M. W. Peterson.
BY Munn & Co.
ATTORNEYS.

UNITED STATES PATENT OFFICE.

MICHAEL W. PETERSON, OF ELLIOTT, ILLINOIS.

DUMPING BOX OR BUCKET.

SPECIFICATION forming part of Letters Patent No. 589,749, dated September 7, 1897.

Application filed April 30, 1897. Serial No. 634,503. (No model.)

*To all whom it may concern:*

Be it known that I, MICHAEL W. PETERSON, of Elliott, in the county of Ford and State of Illinois, have invented a new and Improved Dumping Box or Bucket, of which the following is a specification.

My invention is an improvement in dumping boxes or buckets for use in hoisting and conveying material from one point to another and finally discharging it; and the invention consists in certain novel constructions, combinations, and arrangements of parts, as will be hereinafter described, and pointed out in the claims.

In the drawings, Figure 1 is a diagrammatic view of a warehouse, showing my invention in use. Fig. 2 is a detail sectional view of my dumping-box, the bottom being shown open. Fig. 3 is a perspective view of the box, showing the bottom closed; and Fig. 4 is a detail section showing the manner of locking the bottom.

My invention is especially designed for handling ear corn or grain in cribs, warehouses, or granaries, but may be used in handling coal or other commodities, as may be desired.

The box A may be of any desired shape or design and is provided with a bottom B, hinged at one edge at $b$ and arranged to open and close on such hinge. To the free edge of the bottom is connected the securing-link C, having at its upper end a jointed section D, having an eye $d$ at its free end and arranged in the closed position of the bottom to rest over a pin or projection E and under a pin or projection $e$. This locks the bottom in closed position, so it can be easily opened in the manner presently described.

The bail F is provided at its center with one eye for the hoisting-rope G and at its ends with hooks H, which engage the eyes $h$ on the body or receptacle A, so the bail can be readily attached and detached, as desired.

The bail has a guide $i$ for the tripping-rope I and is provided with the steering-arm J, having a guide $j$ at its outer end for the tripping-rope and jointed at its other end to the bail and secured thereto preferably by a clamp-screw $j'$, which may be tightened to secure the steering-arm in any desired position to one side or the other. As will be seen, this steering-arm J is movable, so as to put the box in proper position before dumping.

The tripping-rope I connects with the jointed section D of the securing-link preferably by means of the hook I', as shown, so it can be readily connected and disconnected. When connected as shown, the tripping-rope may be drawn upon to release the securing-link and permit the bottom to fall and discharge its load.

The dumping-boxes are hoisted by windlasses, or horse or other power, and the crib or warehouse may have a suitable track and carrier, and may also be provided with a dumping-floor having sections K slanting to both sides, part of such floor being hinged at K' to open when desired to dump grain in the middle or between two cribs.

In the use of my improved device the tripping-rope serves also as a steering-rope. It will be seen that when the hoisting-rope has drawn the bucket or box up to the proper elevation for dumping its load a slight pull on the rope I will turn the bucket in the direction the steering-arm is pointing after the latter has been adjusted to the right or the left—that is, a gentle pull on the rope I either to the right or left will swing the bucket around without unlocking the jointed section D.

It will further be seen that all possibility of the bucket revolving more than is necessary and thus tangling the rope is precluded by the adjustable steering-arm.

To trip the locking device, a sharp pull is given to the rope I after the bucket has been swung around to the proper position.

Having thus described my invention, what I claim as new, and desire to secure by Letters Patent, is—

1. A dumping box or bucket comprising the body the hinged bottom, the securing-link having a section and pins or projections over and under which said section may be engaged substantially as described.

2. In a dumping box or bucket substantially as described the bail having a projecting steering-arm provided with a guide for the tripping-rope substantially as described.

3. The combination of the body having a hinged bottom and provided with two pins or projections spaced apart, the securing-link having a section arranged to engage above one and below the other of said pins or projections substantially as described.

4. In a dumping box or bucket a bail provided with a projecting steering-arm and a clamp securing said arm to the bail whereby the arm may be adjusted to and secured in any desired position substantially as described.

5. A dumping box or bucket comprising the body having a hinged bottom, and the two pins or projections spaced apart, the securing-link connected with the bottom and having a section arranged to fit over one and under the other pin or projection the bail having the steering-arm provided with a guide for the tripping-rope and the tripping-rope connected with the securing-rod substantially as described.

6. In a dumping box or bucket, the body having a hinged bottom, and a securing device therefor, an adjustable steering-arm and a rope connected to said securing device and steering-arm, and by which the bucket or box may be swung to any desired position and tripped, as and for the purpose described.

7. The combination with the bucket or box having a hinged bottom and eyes on opposite sides; of the locking device for said bottom, a rope I attached to said locking device, a bail having its ends arranged for engagement with the said eyes, said bail being formed with a guide for said rope, and an adjustable steering-arm carried by said bail and also provided with a guide for the said rope which latter is passed through said guides and serves both as a steering-rope and tripping-rope, substantially as shown and described.

MICHAEL W. PETERSON.

Witnesses:
JOHN L. KREITZER,
STEFFEN O. ROE.